United States Patent [19]

Kiko et al.

[11] Patent Number: 5,504,811
[45] Date of Patent: Apr. 2, 1996

[54] ENHANCED LINE POWERED AMPLIFIER

[75] Inventors: Frederick J. Kiko, Carlsbad, Calif.;
Peter J. Daigneault, Plymouth, N.H.

[73] Assignee: Wilcom, Inc., Delmont, N.H.

[21] Appl. No.: 336,605

[22] Filed: Dec. 29, 1994

[51] Int. Cl.$^6$ .................................................. H04B 3/36
[52] U.S. Cl. ........................ 379/347; 379/398; 379/399; 379/345
[58] Field of Search .................................. 379/347, 345, 379/413, 346, 399, 398

[56] References Cited

U.S. PATENT DOCUMENTS

| | | |
|---|---|---|
| 4,961,218 | 10/1990 | Kiko ......................................... 379/347 |
| 5,422,929 | 6/1995 | Hurst et al. ............................... 379/347 |

*Primary Examiner*—Jeffery Hofsass
*Assistant Examiner*—Jacques M. Saint-Surin
*Attorney, Agent, or Firm*—Dilworth & Barrese

[57] ABSTRACT

An enhanced amplifier for interconnecting a two-wire, bidirectional cable side transmission path and a two-wire bidirectional equipment side transmission path in a communication system includes a first splitter and a second splitter. The first splitter is formed of a cable-to-equipment voltage sense amplifier, a shunt current driver, and a series current compensator for generating a first simulated terminating impedance. The second splitter is formed of an equipment-to-cable voltage sense amplifier, the shunt current driver and the series current compensator for generating a second simulated terminating impedance. Other features disclosed include manual balancing circuitry for manually adjusting the cable side balance networks. Further, a loopback circuit is provided form facilitating remote testing and alignment of the amplifier from the cable side.

7 Claims, 10 Drawing Sheets

ENHANCED LINE POWERED AMPLIFIER

BACKGROUND OF THE INVENTION

1. Field of the Invention

This invention relates generally to telephone communication systems employing bidirectional voice frequency repeaters and more particularly, it relates to an enhanced line powered amplifier which functions as a bidirectional voice frequency repeater, having automatic gain adjustment circuitry and manual balancing circuitry.

2. Description of the Prior Art

Recent advances in line power amplifiers for enhancing signals in a two-wire bidirectional transmission path in telephone systems include power derivation circuitry for deriving power from the transmission lines, automatic gain adjustment for automatically setting the gain to a fixed level and automatic balancing circuitry for automatically adjusting the balance networks on both the cable side (typically the telephone central office) and equipment side (e.g., the subscriber equipment).

U.S. Pat. No. 4,961,218 to Kiko discloses an enhanced line power amplifier with the above advances. The amplifier as disclosed in the '218 patent performed well for a variety of voice grade two-wire special service circuits requiring transmission treatment including Centrex, PBX-CO trunks, WATS lines and analog data lines. The disclosure of U.S. Pat. No. 4,961,218 is incorporated by referenced herein.

For applications in which the cable side device also includes automatic balancing circuitry, such as in high speed modem circuits, a problem may arise when the automatic balance circuit in the modem and the automatic balance circuit in the amplifier simultaneously attempt to balance the cable between them, resulting in an unstable operating condition.

Therefore, a need exists for an amplifier which includes a manual adjustment to its impedance for balancing itself to the network.

Another desirable feature in repeater amplifier applications is the provision in the amplifier for remote testing and alignment, which facilitates off-site testing of the amplifier by the cable side or central office equipment.

SUMMARY OF THE INVENTION

The amplifier according to the present invention is for interconnecting a two-wire, bidirectional cable side transmission path and a two-wire, bidirectional equipment side transmission path in a communication system, the amplifier includes: first circuitry for receiving first signals originating from the cable side transmission path and arriving at a cable side port for amplifying and transmitting the first signals to the equipment side transmission path via an equipment side port; second circuitry coupled to receive second signals originating from the equipment side transmission path and arriving at the equipment side port for amplifying and transmitting the first signals to the cable side transmission path via the cable side port;

the first circuitry includes a cable-to-equipment voltage sense amplifier, a shunt current driver, and a series current compensator, the cable-to-equipment sense amplifier being coupled to the cable side port for generating a cable voltage, the shunt driver and the series current compensator being responsive to the cable side voltages for generating a first current which is passed to the cable side transmission path to provide a first simulated terminating impedance;

the second circuitry also includes the equipment-to-cable voltage sense amplifier, the shunt current driver, and the series current compensator, the equipment-to-cable voltage sense amplifier being coupled to the equipment side port for generating an equipment side voltage, the shunt driver and the series current compensator being responsive to the equipment side voltage for generating a second current which is passed to the equipment side transmission path to provide a second simulated terminating impedance;

cable-to-equipment gain/equalizer circuit being also responsive to the cable side voltage for generating a cable-to-equipment gain control voltage, the shunt driver and the series current compensator being responsive to the cable-to-equipment control voltage for generating an amplified cable-to-equipment signal to the equipment side port;

equipment-to-cable gain/equalizer circuit being also responsive to the equipment side voltage for generating an equipment-to-cable gain control voltage, the shunt driver and the series current compensator being responsive to the equipment-to-cable gain control voltage for generating an amplifier equipment-to-cable signal to the cable side port;

equipment side balance network being also responsive to the cable side voltage for preventing the first signals originating from the cable side transmission path and sensed by the equipment-to-cable sense amplifier from being returned to the cable side port; and balancing circuit responsive to the cable side voltage and the equipment-to-cable gain control voltage for facilitating manual adjustment of the cable side balance network to match impedance on the cable side transmission path.

The balancing circuit may further include an AGC amplifier and a correlation circuit for generating an error signal when there exists a phase shift in a signal seen at both the transmit and receive ports of the first circuitry. First and second LEDs are provided for signalling an error condition, the first LED for signalling when the cable side transmit voltage is higher than the cable side receive voltage and the second LED for signaling when the cable side receive voltage is higher than the cable side transmit voltage.

Additionally, a loopback circuit is provided for remotely testing the amplifier. The loopback circuit preferably includes: a time generator for generating a test tone at a first frequency; a timer; and a time detector for detecting signals from the cable side at a second frequency.

BRIEF DESCRIPTION OF THE DRAWINGS

These and other objects and advantages of the present invention will become more apparent from the following detailed description when read in conjunction with the accompanying drawings with like reference numerals indicating corresponding parts throughout, wherein:

FIG. 5 is a schematic of the manual balance circuitry of the present invention;

DESCRIPTION OF THE PREFERRED EMBODIMENTS

Figure 1:
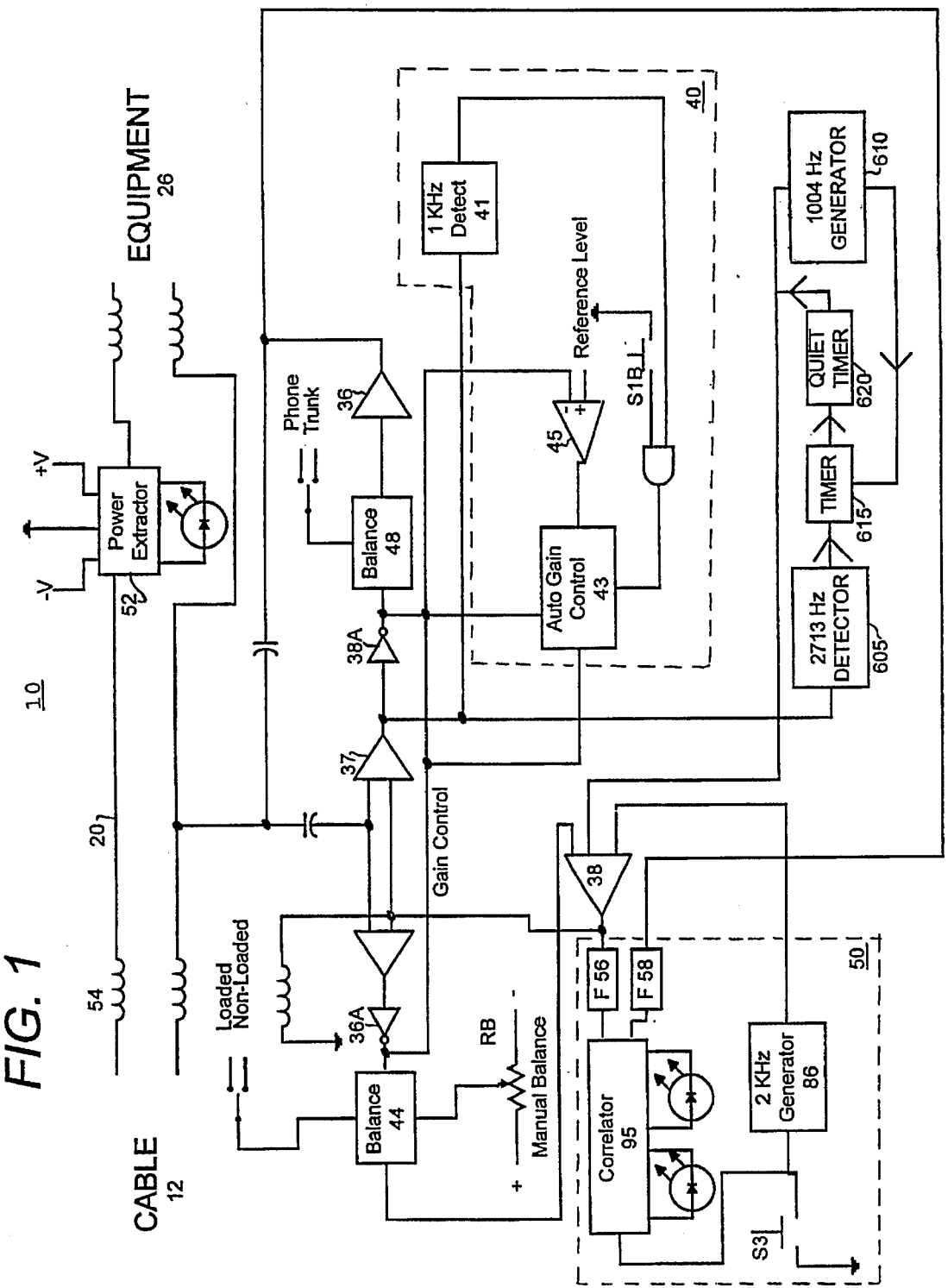
FIG. 1 is a block diagram of a bidirectional two-wire communication system utilizing an enhanced line powered amplifier incorporating the principles of the present invention.

Referring now in detail to the drawings, there is shown in FIG. 1 a general telephone communication system which utilizes an enhanced line powered amplifier 10 incorporating the principles of the present invention. A transmission line 12 is connected to the central office equipment in a central office (not shown) via a two-wire cable pair. The enhanced line powered amplifier 10 includes a cable balance network 44, an equipment balance network 48, automatic gain adjustment circuitry 40, manual balancing circuitry 50, and a power extractor circuit 52. The cable side of the transmission line 12 is also connected to the central office's tip and ring leads.

The circuit 10 includes an amplifier 37 used to amplify audio or voice frequency signals in the equipment direction and an amplifier 38 used to amplify audio or voice frequency signals in the cable direction. The automatic gain adjustment circuitry 40 is used to facilitate the initial setting of the gains for the gain/equalizer networks 36a, 38a as will be described hereinafter. The manual balancing circuitry 50 is used to manually adjust the equipment side balance network 44 so as to match the varying line impedances. The manual balancing circuitry will be discussed in more detail below.

The power extractor circuit 52 is used to extract a portion of the DC voltage appearing in the transmission line 12. The power extractor circuit 52 is connected in series between the coils 54 in a D.C. bypass line 20. The coils are used to block A.C. current but permit D.C. current to pass from the central office (cable) side 12 to the subscriber (equipment) side 26. The circuit 52 includes a polarity guard to accommodate reverse battery operation and then generates supply voltages of approximately ±3.9 volts for use by the line powered amplifier 10.

The automatic gain adjustment circuitry 40 includes a 1 KHz detector 41 connected to the output of the amplifier 37, a push-button switch S1B, a gain control circuit 43, and a dBm reference amplifier 45. Normally, after the line powered amplifier 10 is installed the installer will use a butt-in or telephone set to connect to the equipment side via test access jack 47 (FIG. 6) and dials up a milliwatt value, which is 0 dBm at 1 KHz. This 1 KHz signal will be attenuated by the transmission line 12 to about −4 to −8 dBm level and will arrive on the receive line 20.

The amplifier 37 will pass this signal to the detector 41 where it is detected. When the switch S1B is depressed, the reference amplifier 45 will cause the gain control circuit 43 to increase the output of the gain/equalizer network 38a until it reaches the −4 dBm level. The gain will now be stopped from increasing and will be locked-in by the gain control circuit 43.

The balancing circuitry 50 provides impedance balancing on the cable side and is adjusted manually. To balance impedance a 2 KHz signal is introduced toward the cable side by depression of switch S3 to pass the signal from the 2 KHz generator 86. If there is impedance imbalance at the cable side, an echo signal is reflected from the cable side 12 (or central office). The echo signal generates an error signal. The error signal turns on either the GRN or the RD LEDs (FIGS. 5 and 6) dependent upon the direction of imbalance. The error signal is nulled by manually setting the balance network 44 by adjusting RB. When optimal balance is achieved, both LEDs are off.

Figure 2:
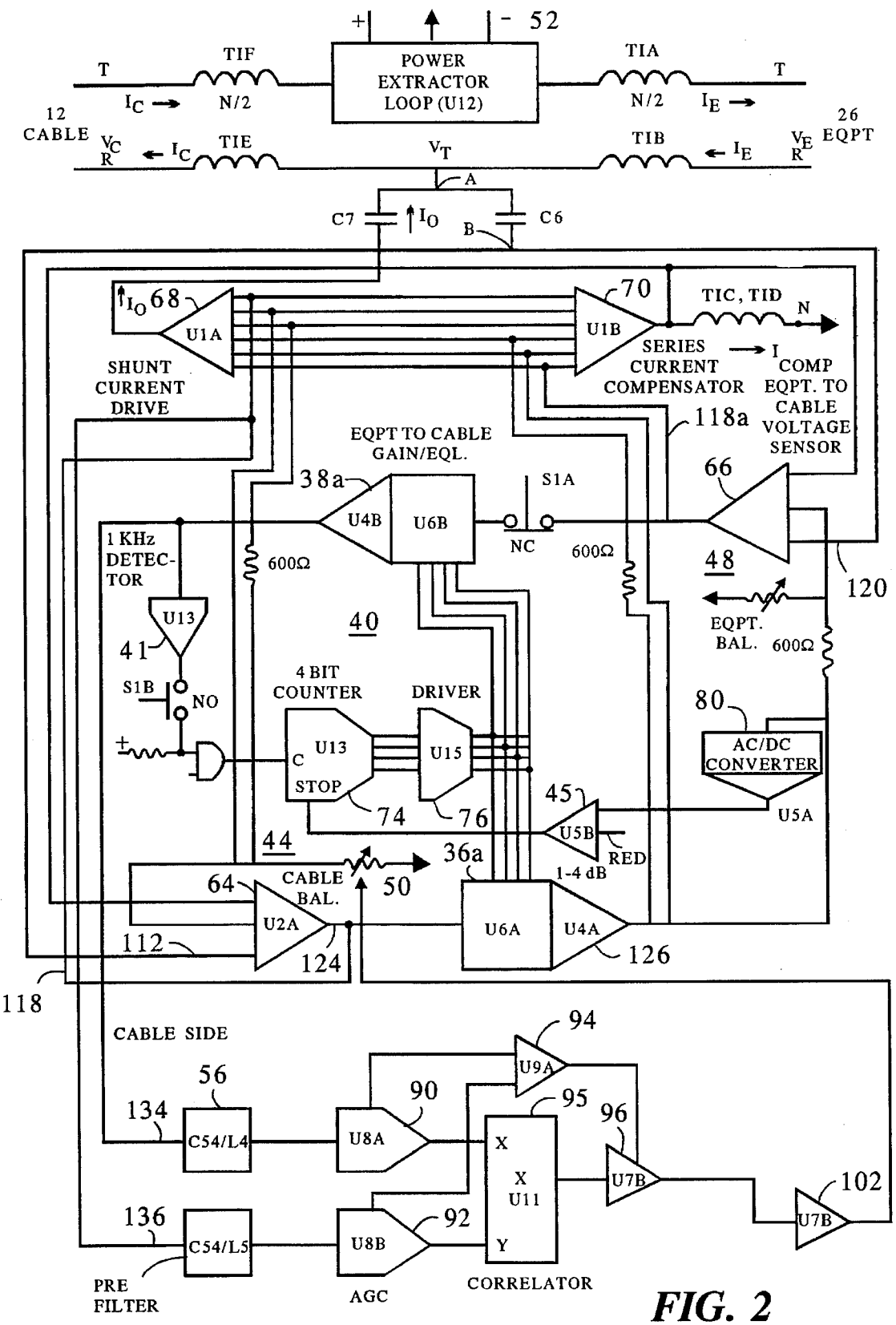
FIG. 2 is a more detailed block diagram of the enhanced line powered amplifier of the present invention.
Figure 3A:
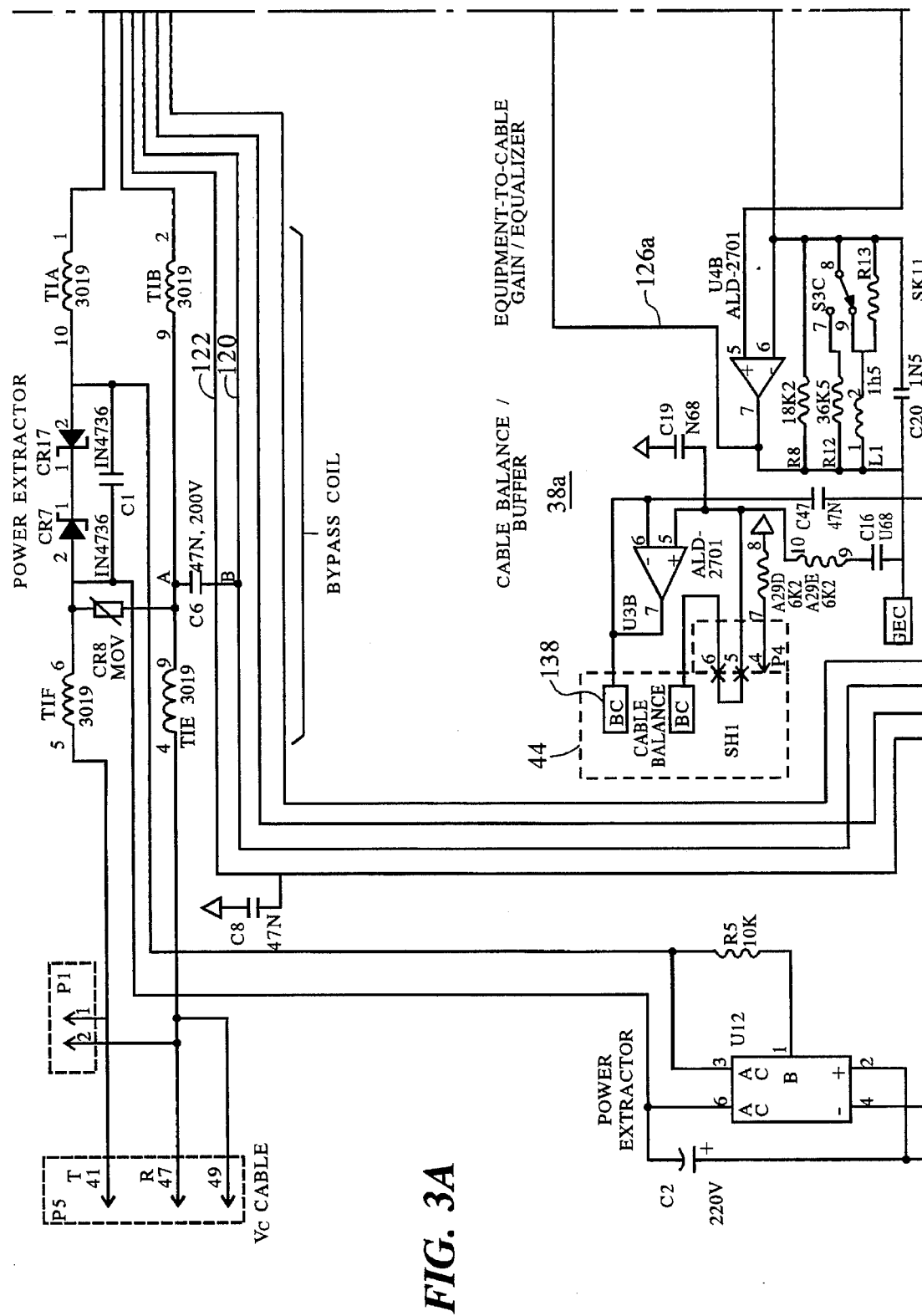
FIGS. 3A, 3B, 3C and 3D when connected together, are detailed schematic circuit diagrams of the enhanced line powered amplifier constructed in accordance with the present invention, except for the balancing networks and the manual balancing circuitry.
Figure 3B:
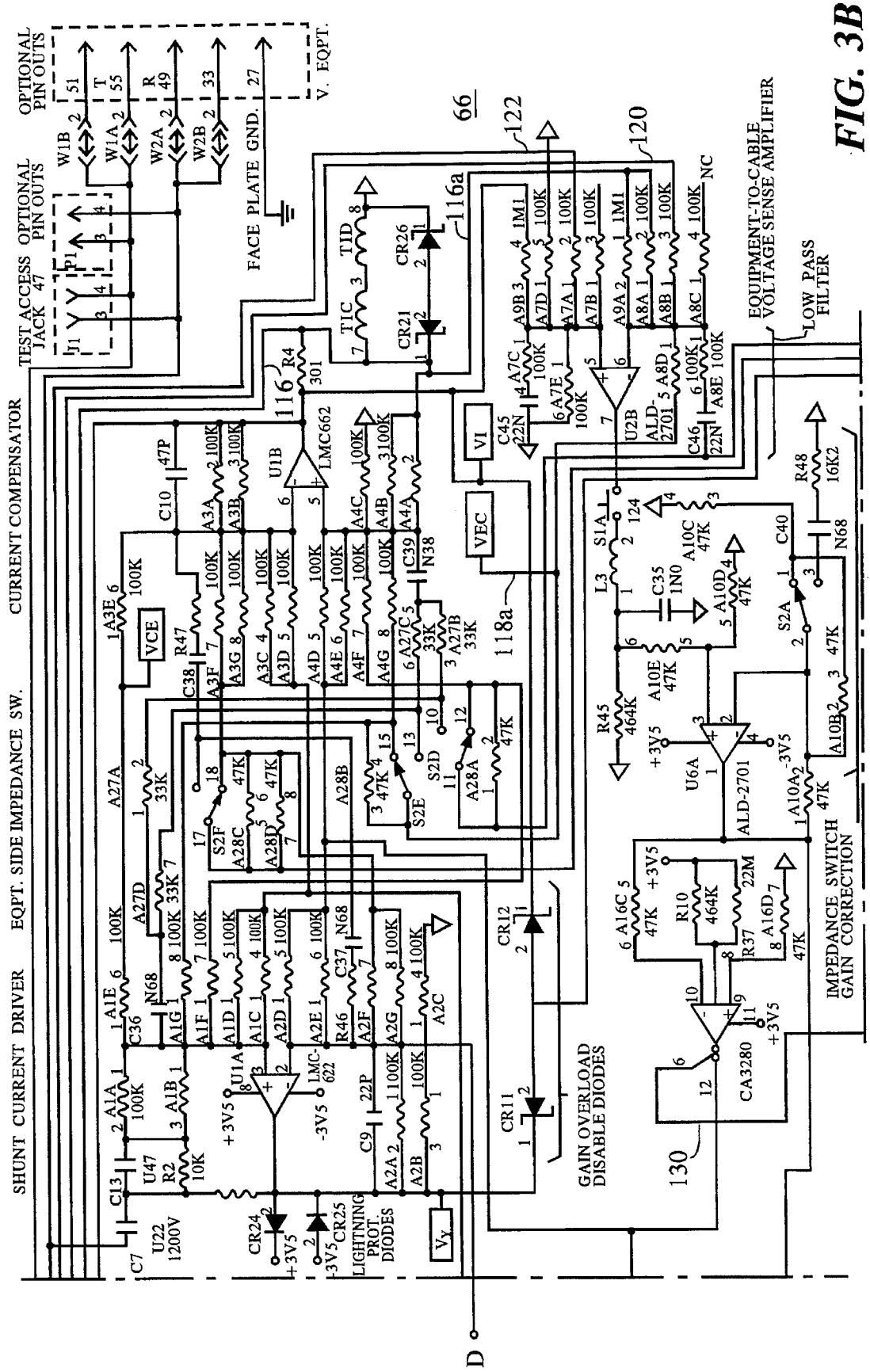
Figure 3C:
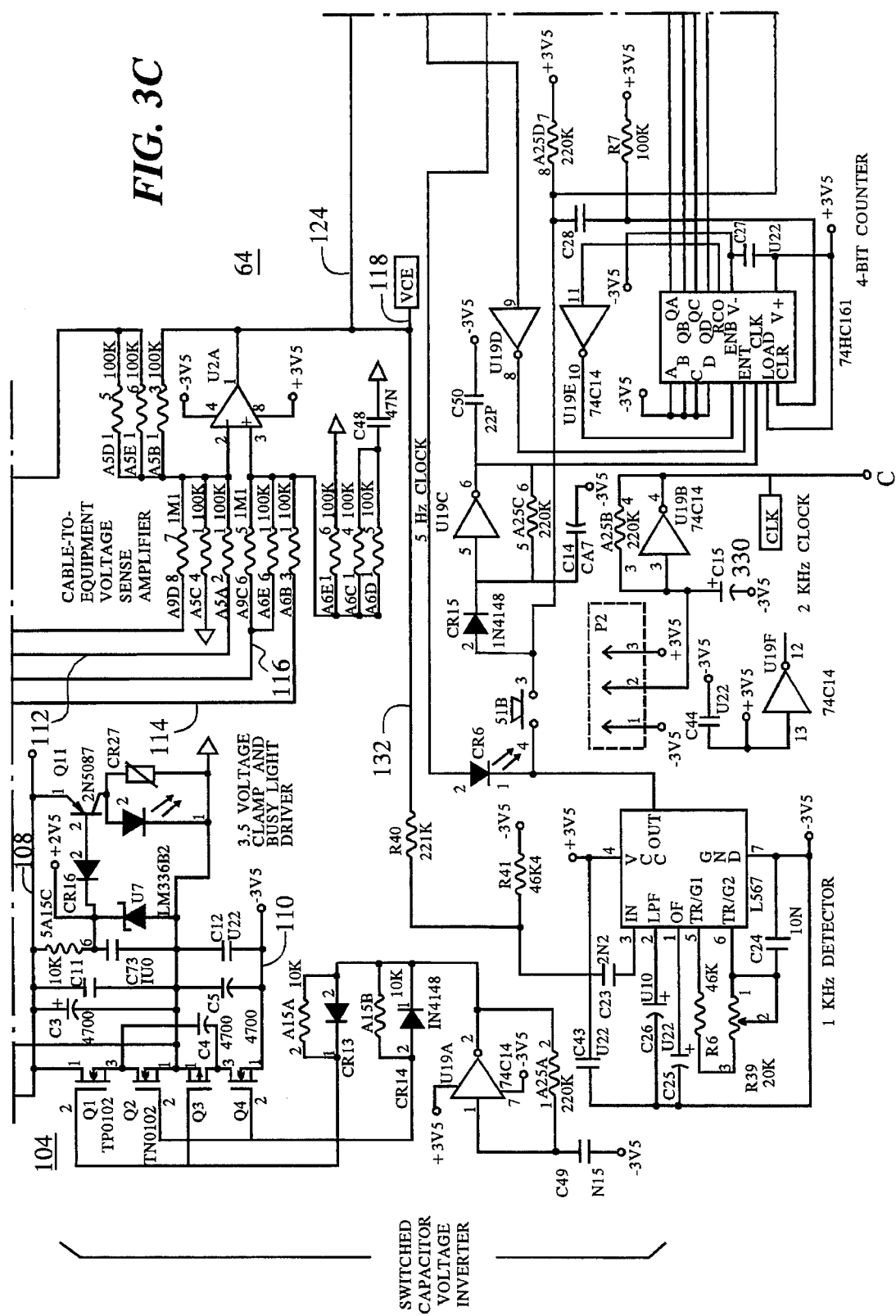
Figure 3D:
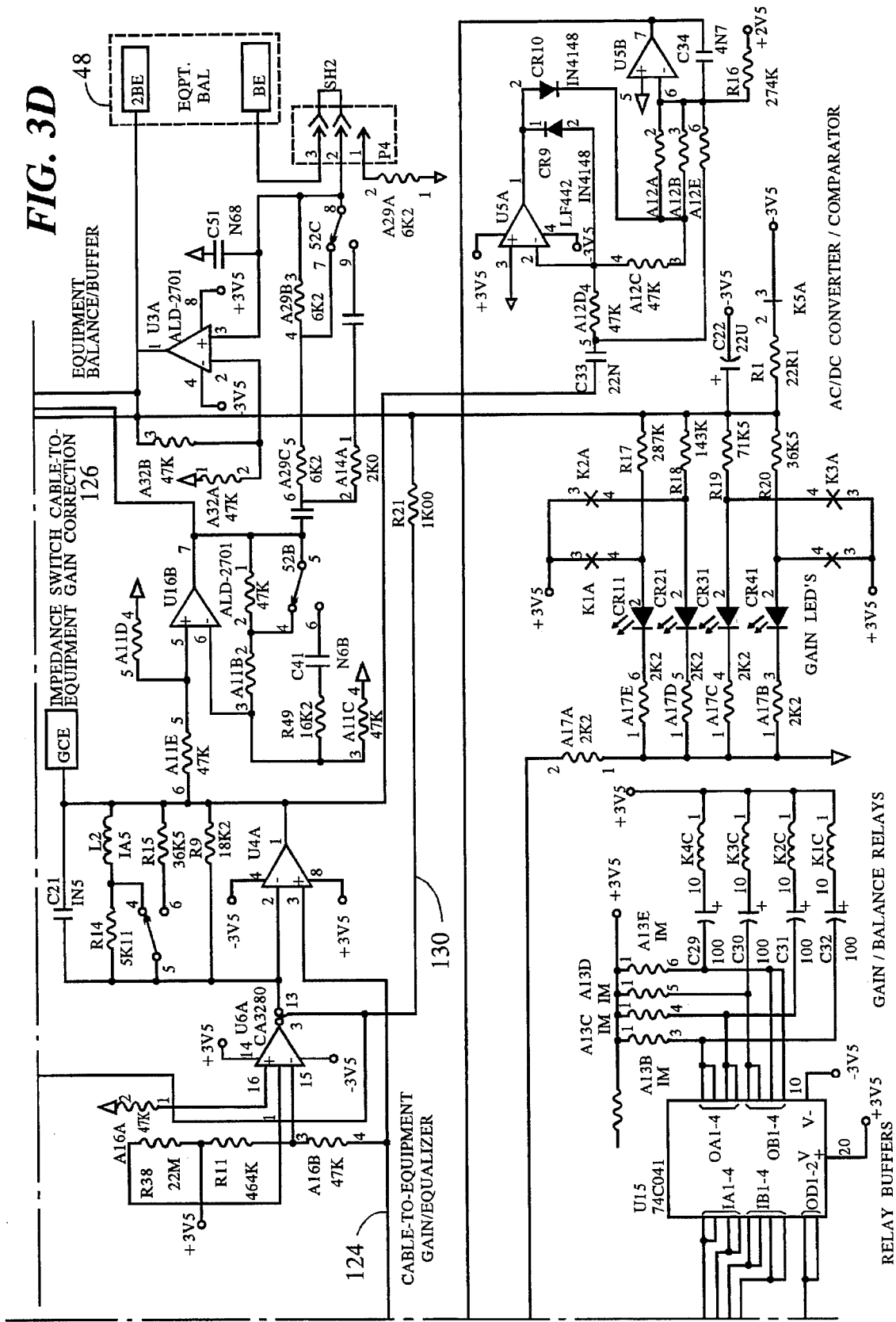

Referring now to FIG. 2, there is illustrated a more detailed block diagram of the present invention. A transformer T1 is provided with four primary windings T1F, T1E, T1A, T1B for coupling the D.C. voltages from the cable side 12 to the equipment side 26. The transformer T1 is also formed with a pair of secondary windings T1C and T1D. It will be noted that all of the primary windings should have the same number of turns. Further, the total number of turns due to the windings T1F and T1E on the cable side are made to be equal to the same number of turns on the secondary windings T1C and T1D. Similarly, the total number of turns due to the windings T1A and T1B on the equipment side are also made equal to the number of turns on the secondary windings. The power extractor circuit 52 is coupled between the windings T1F and T1A.

The automatic gain adjustment circuitry 40 includes a 1 KHz detector 41, switch S1B, a 4-bit counter 74, a buffered driver 76, an AC/DC converter 80, and the −4.0 dBm reference amplifier 45. The manual balancing circuitry includes the bandpass filter 56, the bandpass filter 58, a 2 KHz tone generator 86 (FIG. 1), automatic gain control (AGC) amplifiers 90 and 92, a direction detector 94, a driver 96, a correlator/multiplier 95, current to voltage amplifier 102.

Figure 4A:
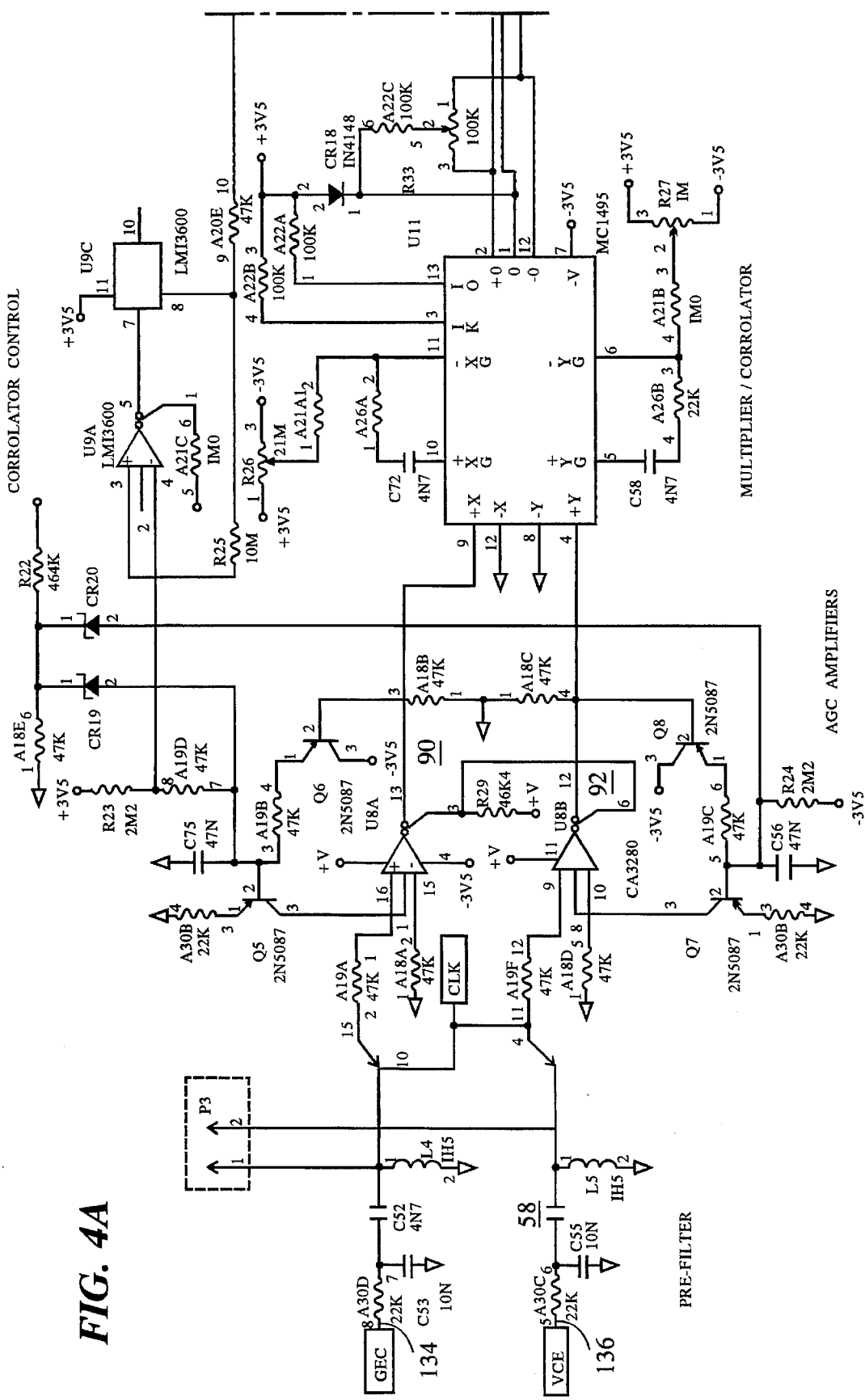
FIGS. 4A, 4B, and 5, when connected together, form a detailed schematic diagram of the balancing networks and the balancing circuitry for use in the enhanced line powered amplifier of the present invention.
Figure 4B:
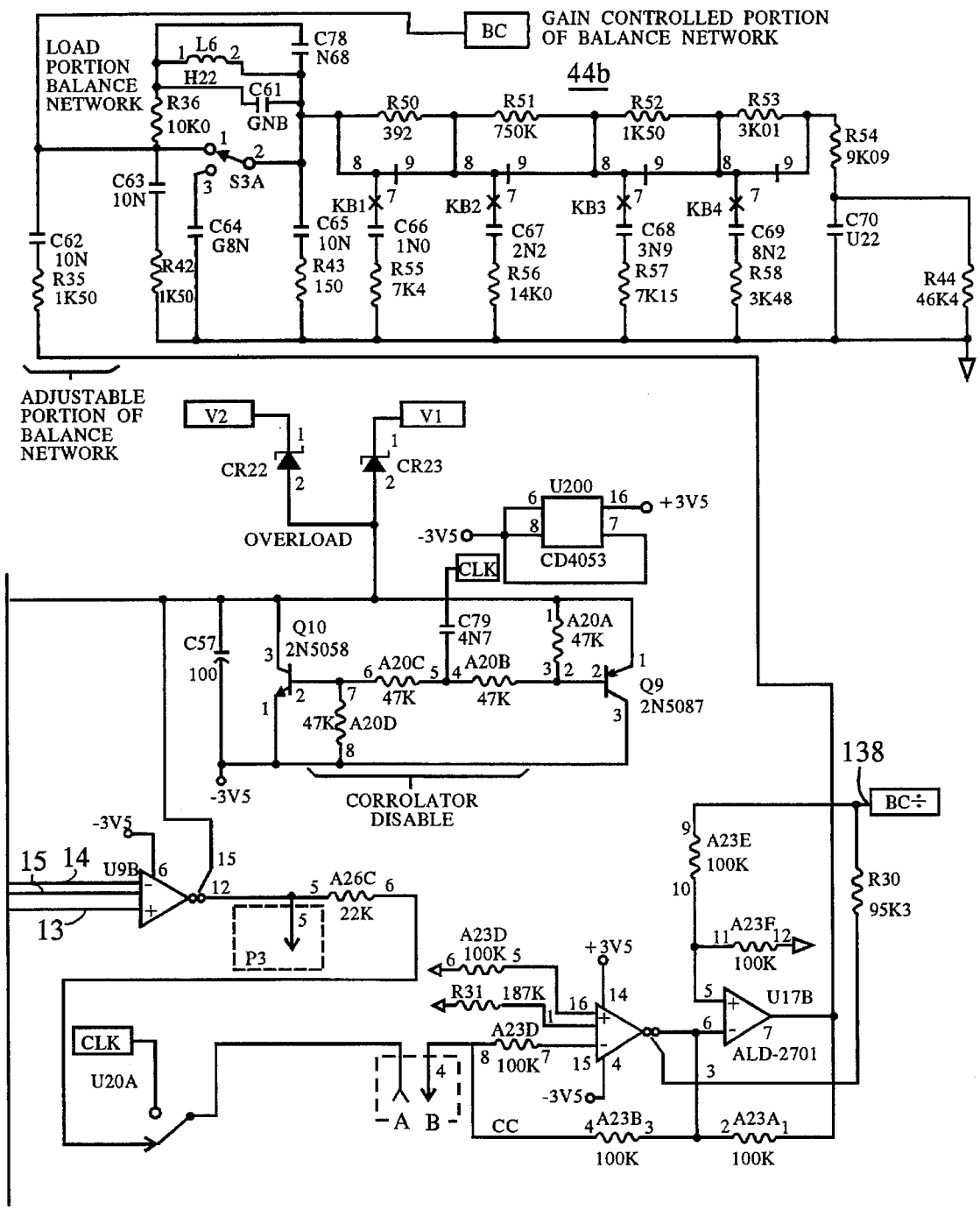

In FIGS. 3A–3D, there is shown a detailed schematic circuit diagram of the various blocks used to form the voltage sense amplifier 64, voltage sense amplifier 66, shunt current driver 68, series current compensator 70, and the automatic gain adjustment circuitry 40 of FIG. 2. In FIGS. 4A and 4B, there is illustrated a detailed schematic circuit diagram of the various blocks used to form the cable side balance network 44, the equipment side balance network 48, and the manual balancing circuitry 50 of FIG. 2.

Figure 5:
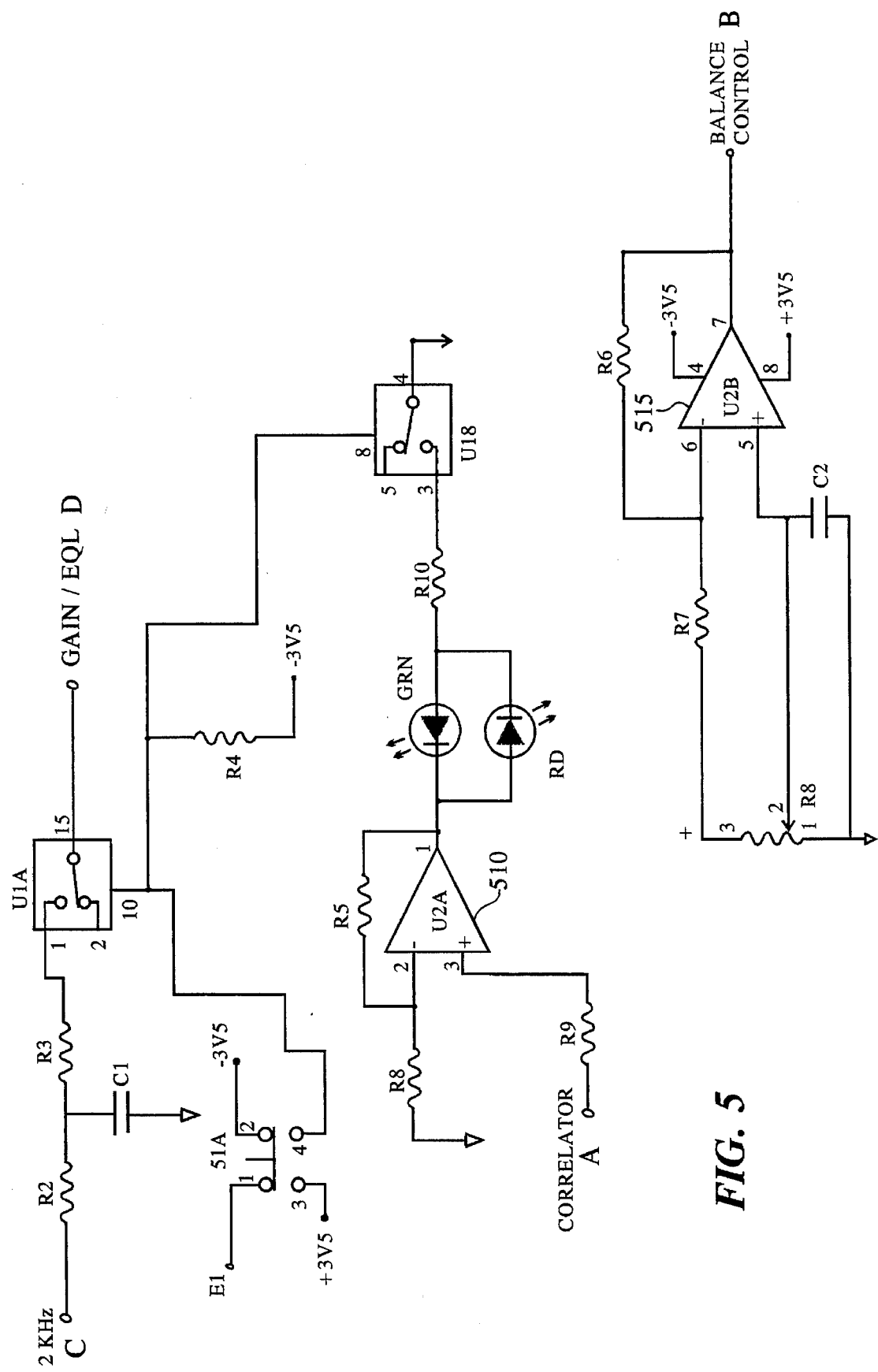

A representative circuitry for implementing the manual adjustment is shown in FIG. 5. As shown, depression of switch S1A passes the 2 KHz signal to the cable side. The echo signal reflected from the cable side is correlated in correlator 95 (FIG. 2). The error signal output of the correlator 95 (FIG. 2) turns on RD LED if the error level is positive. If the error level is negative, then the GRN LED is turned on. Potentiometer RB provides an adjustable balance control that is adjusted until both LEDs are off indicating optimal balance has been reached.

Figure 6:
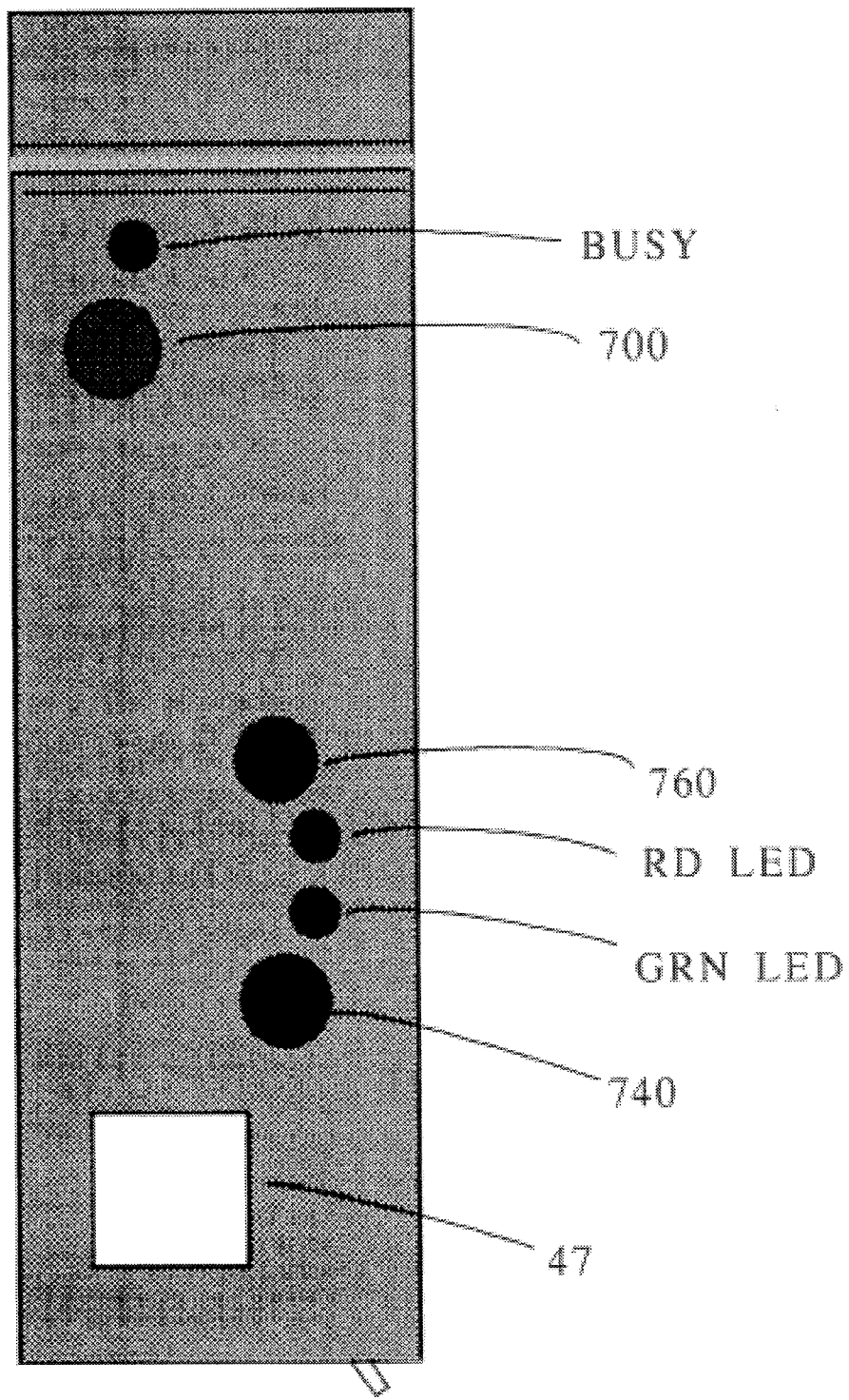
FIG. 6 is a diagram of a face plate showing the various indicator light-emitting diodes and test access jack.

Referring to FIGS. 2 and 6, an illustrative approach to align the amplifier is as follows:

1. Connect equipment side T and R to manual balance set or test set with dial-up and hold capability and 600 ohms impedance.

2. Go OFF HOOK and dial a 1 mW (1004 Hz, 0 dBm, 600 Ωm) generator from a serving central office.

3. In the presence of a 1004 Hz tone, depress the GAIN SET BUTTON 700 until clicking stops (3 or 4 seconds, typically). Then terminate the call.

4. Go OFF HOOK and initiate call to QUIET termination. Listen until the QUIET termination is attached. This is typically, 1004 Hz is sent for a few seconds, followed by the QUIET termination (900 Ω+2.16 μF)).

5. With the quiet termination attached, depress and hold the BALANCE ADJUSTMENT BUTTON 740 on the faceplate and turn the ADJUSTMENT POTENTIOMETER 760 until the RED and GREEN LEDs are both extinguished. This is the point of maximum echo return loss or optimum balance.

6. Terminate the call. The amplifier will maintain the gain and balance settings until this procedure is re-initialized.

The amplifier according to the present invention further provides remote access alignment capabilities which enables the amplifier to be remotely accessed, tested for proper levels and realigned. Referring to FIG. 1, a 2713 Hz detector 605 detects a 2713 Hz tone sent from the cable side signalling remote access or testing. The amplifier then sends a 1004 Hz signal from the 1004 Hz generator 610 to the cable side equipment. The 1004 Hz signal is preferably set at −13 dBm. Timer 615 and quiet timer 620 times the 1004 Hz signal for a duration of around 45 seconds and then presents the cable side with a quiet termination, e.g., at 600 ohms and 2 μf). During this period a noise measurement may be made by the cable side or central office equipment. With the reference level of signal at −13 dbm sent to the cable side, the cable side equipment or central office can measure cable or facility loss by measuring the signal level received at the central office. If necessary a 1004 Hz tone at 0 dbm may be sent from the cable side to realign the amplifier.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

We claim:

1. An enhanced amplifier for interconnecting a two-wire, bidirectional cable side transmission path and a two-wire, bidirectional equipment side transmission path in a communication system, said enhanced amplifier comprising:

first means coupled to receive first signals originating from the cable side transmission path and arriving at a cable side port for amplifying and transmitting said first signals to the equipment side transmission path via an equipment side port;

second means coupled to receive second signals originating from the equipment side transmission path and arriving at the equipment side port for amplifying and transmitting said second signals to the cable side transmission path via the cable side port;

said first means including cable-to-equipment voltage sense amplifier means, shunt current driver means, and series current compensator means, said cable-to-equipment sense amplifier means being coupled to said cable side port for generating a cable voltage, said shunt driver means and said series current compensator means being responsive to said cable side voltages for generating a first current which is passed to said cable side transmission path to provide a first simulated terminating impedance;

said second means including equipment-to-cable voltage sense amplifier means, said shunt current driver means, and said series current compensator means, said equipment-to-cable voltage sense amplifier means being coupled to said equipment side port for generating an equipment side voltage, said shunt driver means and said series current compensator means being responsive to said equipment side voltage for generating a second current which is passed to said equipment side transmission path to provide a second simulated terminating impedance;

cable-to-equipment gain/equalizer circuit means being also responsive to said cable side voltage for generating a cable-to-equipment gain control voltage, said shunt driver means and said series current compensator means being responsive to said cable-to-equipment control voltage for generating an amplifier cable-to-equipment signal to said equipment side port;

equipment-to-cable gain/equalizer circuit means being also responsive to said equipment side voltage for generating an equipment-to-cable gain control voltage, said shunt driver means and said series current compensator means being responsive to said equipment-to-cable gain control voltage for generating an amplified equipment-to-cable signal to said cable side port;

equipment side balance network means being also responsive to said cable side voltage for preventing said first signals originating from the cable side transmission path and sensed by said equipment-to-table sense amplifier means from being returned to said cable side port; and balancing means responsive to said cable side voltage and said equipment-to-cable gain control voltage for manually adjusting said cable side balance network means to match impedance on said cable side transmission path.

2. An enhanced amplifier as claimed in claim 1, wherein said balancing means includes AGC amplifier means and correlation circuit means for generating an error signal when said equipment-to-cable balance does not match.

3. An enhanced amplifier as in claim 1 wherein said balancing means includes first and second LEDs for signalling an error condition, said first LED for signalling when said cable side impedance is higher than said cable impedance and said second LED for signaling when said cable side impedance is lower than said cable impedance.

4. An enhanced amplifier for interconnecting a two-wire, bidirectional cable side transmission path and a two-wire, bidirectional equipment side transmission path in a communication system, said line powered amplifier comprising:

first means coupled to receive first signals originating from the cable side transmission path and arriving at a cable side port for amplifying and transmitting said first signals to the equipment side transmission path via an equipment side port;

second means coupled to receive second signals originating from the equipment side transmission path and arriving at the equipment side port for amplifying and transmitting said second signals to the cable side transmission path via the cable side port;

said first means including cable-to-equipment voltage sense amplifier means, shunt current driver means, and series current compensator means, said cable-to-equipment sense amplifier means being coupled to said cable side port for generating a cable voltage, said shunt driver means and said series current compensator means being responsive to said cable side voltages for generating a first current which is passed to said cable side transmission path to provide a first simulated terminating impedance;

said second means including equipment-to-cable voltage sense amplifier means, said shunt current driver means, and said series current compensator means, said equipment-to-cable voltage sense amplifier means being coupled to said equipment side port for generating an equipment side voltage;

amplifier gain/equalizer circuit means being responsive to said cable side voltage for generating a cable-to-equipment gain control voltage, said shunt driver means and said series current compensator means being responsive to said control voltage for generating an amplifier signal to said equipment side port;

equipment side balance network being selectably switched for phone or cable hook-up;

balancing means responsive to said cable side voltage and said equipment-to-cable gain control voltage for manually adjusting said cable side balance network means to match impedance on said cable side transmission path; and loopback circuit mean for remotely testing said amplifier.

5. An enhanced amplifier according to claim 4 wherein said loopback circuit means includes:

a tone generator for generating a test tone at a first frequency;

a timer; and a tone detector for detecting signals from said cable side at a second frequency.

6. The enhanced amplifier as in claim 1, further including a power extractor for extracting power from said communication path for use by said enhanced amplifier.

7. The enhanced amplifier as in claim 4, further including a power extractor for extracting power from said communication path for use by said enhanced amplifier.

* * * * *